United States Patent Office 2,979,242
Patented Apr. 11, 1961

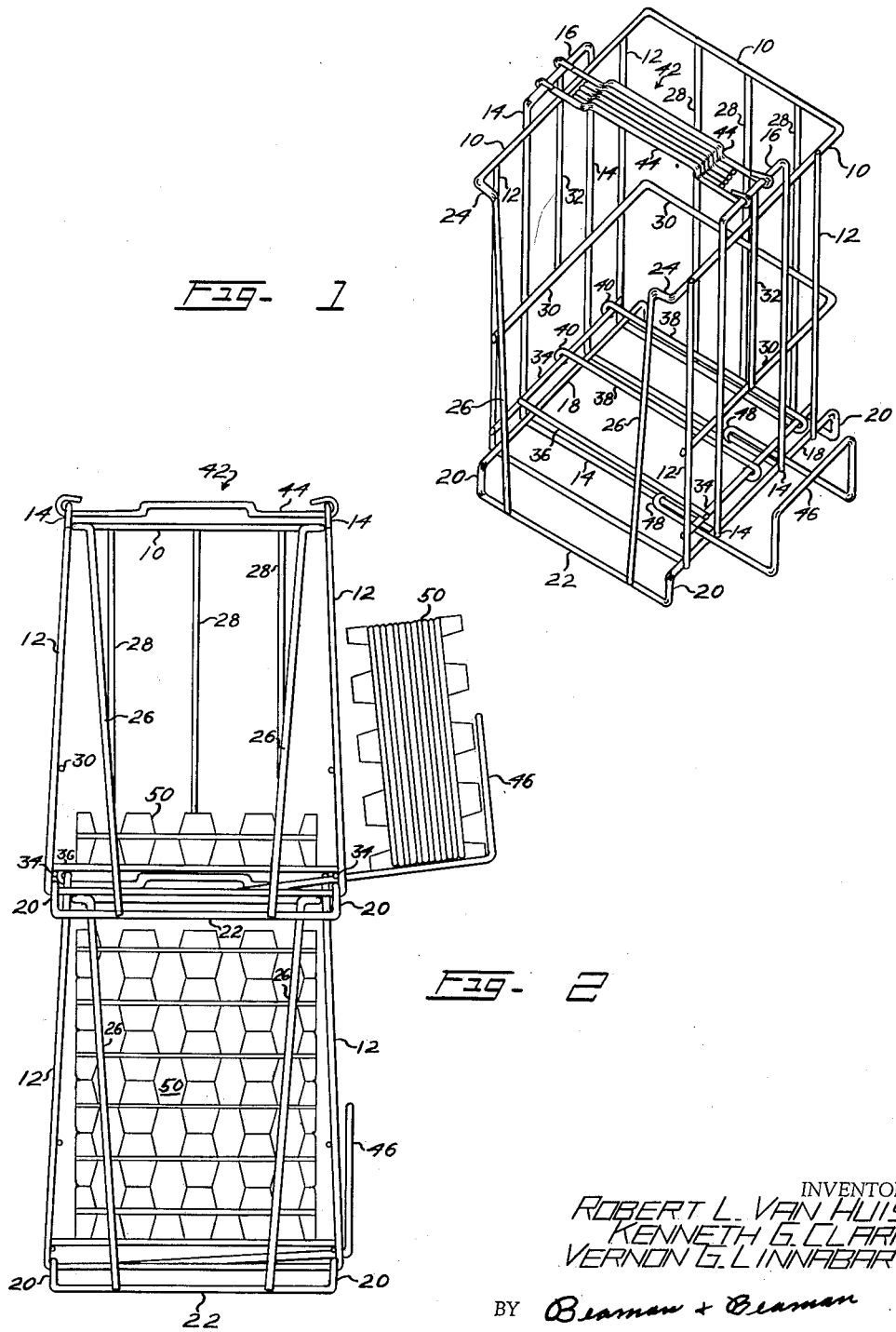

2,979,242

EGG CRATE

Robert L. Van Huis, Holland, Vernon G. Linnabary, Jackson, and Kenneth G. Clark, Parma, Mich., assignors to The Automatic Poultry Feeder Co., Zeeland, Mich.

Filed Nov. 1, 1957, Ser. No. 693,956

2 Claims. (Cl. 224—45)

The invention relates to food handling equipment and particularly relates to a basket for receiving, storing and transporting eggs.

The normal method of processing eggs begins with the collection of the eggs from the laying nests or batteries. Normally the eggs are placed loosely within wire baskets, the bottom eggs supporting the weight of the eggs above. Eggs loosely packed in this manner are subject to being broken as the basket is carried about and loss due to breakage is common. Another disadvantage of loosely placing eggs in the collection basket results from the fact that the eggs are placed in the basket at random without consideration of the orientation of the egg to the force of gravity which results in decentering of the yolk and a consequently lower graded egg. Also, closely packed eggs do not cool effectively.

The problem of breaking, cooling and decentering yolks has been controlled by the use of flats formed of paper or other material which is placed between vertical layers of eggs and are formed with pockets and protrusions separating each egg from the other, equally distributing the weight of the upper eggs over the lower eggs preventing destructive stresses being placed on any egg. When the eggs are placed in the flats the small end of the egg is placed downward keeping the yolk centered and the flats will maintain the egg in this position at all times. As the flats maintain air spaces between the eggs efficient and rapid cooling is facilitated which is very important as rapid cooling of the egg is necessary to preserve the freshness for the maximum length of time.

The use of flats has heretofore been limited to usage with egg crates and other large bulky containers used in the transportation and storing of eggs and it is an object of the invention to provide a small portable egg basket which utilizes flats to separate the eggs.

Another object of the invention is to produce a lightweight container for conventional egg flats which may easily be loaded and unloaded and is provided with a rack for the unloaded flats.

A further object of the invention is to provide a portable egg basket utilizing flats which permits unrestricted air circulation through the basket.

Yet another object of the invention is to produce an egg basket using flats which may be stacked upon each other in interlocking relationship for storing purposes.

These and other objects of the invention will become apparent from the following description and accompanying drawing wherein:

Fig. 1 is a perspective view of the basket of the invention without filler flats, and Fig. 2 is an elevational view of two baskets in stacked relation illustrating the location of the flats in loaded and unloaded positions.

The preferred embodiment of the invention is constructed of wire as illustrated in Fig. 1 and consists basically of a rectangular box-like frame open at the top and one end. The frame is formed from several U-shaped members welded at the open end to a top rim wire 10. The U-shaped members consist of single wire U's 12 and a double U 14 which is similar to the members 12. However, the vertical elements extend above rim 10 and are connected at the top by the integral horizontal portion 16.

A base is formed from a rectangular wire 18 which rests upon and is welded to the top of the horizontal portions of U members 12 and 14. The ends of rectangle 18 are bent downward at right angles at 20 to form legs which support the wires 12 and 14 off the ground. The ends 22 of rectangle 18 will contact the ground and permit a hand or fork truck to get beneath the basket if desired and perform an important function in stacking as will be explained.

The rim wire 10 is bent at 24 in a horizontal direction for a short distance and then is directed downward at 26 and welded to the portion 22 of wire 18. It will be noted that the downward extending portions 26 converge toward each other thereby providing vertical access to the entire depth of the basket, however, preventing the flats from slipping out of the confines of the basket.

The side of the basket frame opposite wires 26 is enclosed by three vertical wires 28 welded at the upper end to rim wire 10 and at the lower end to the rear wire portion 22, not visible in Fig. 1. A reinforcing U 30 may be placed within the frame and welded to the vertical wire members to strengthen the frame. A pair of vertical positioning wires 32 are T-welded to the underside of 16 at the upper end and to the U 30 at the lower end.

A shelf is formed within the basket frame to support the filler flats. This shelf consists of a pair of horizontal wire members 34 welded in opposite relation to the vertical portions of U members 12 and 14. A fixed cross member 36 is welded between the wires 34 toward the forward ends as viewed in Fig. 1 and a pair of adjustable cross members 38 interconnect wires 34 at the intermediate and rear portions of wire 34. The adjustable cross members 38 are formed with loops 40 at their ends which loosely encompass the wires 34 permitting limited horizontal translation of the cross members 38 along wire 34.

To facilitate easy one-hand manipulation of the basket, a handle 42 is provided and consists of a pair of spaced formed wire members 44 provided with open loops at the ends which hook under the wire portions 16, one wire 44 being on one side of positioning wire 32 and the other wire 44 being on the opposite side of 32 thereby maintaining the handle in a central position on the wires 16. A series of additional wires may be welded between wires 44 to form a greater surface area on the handle making the handle 42 more comfortable to the hand.

A retractable rack 46 is provided for storage of the flats during loading of the basket. The rack 46 is of substantially L-shape, formed of a single piece of wire, the legs of which extend over the base wire 18. A loop 48 is formed on the end of the legs which slidingly encircle the horizontal portions of the U-members 14. Thus, the rack 46 may be retracted as shown in the lower basket of Fig. 2 or extended as shown in the upper basket of Fig. 2.

In use, the first egg flat is placed upon the cross arms 36 and 38, the wires 38 may be adjusted to best receive the flat irrespective of the various designs of flats available, and the flat loaded, another flat is inserted on the top of the filled flat and in the normal manner a total of fifteen dozen or so eggs may be placed with the basket on flats. Fig 2 illustrates a filled basket supporting a second basket about to be loaded. The flats 50 fit within the baskets with sufficient clearance about the edges to permit easy removal and insertion of the flats.

However, it will be noted that the portions 26 prevent the flats 50 from sliding out of the open end of the basket.

The baskets are dimensioned such that the sides and ends thereof taper slightly toward the top to permit stacking. As seen in Fig. 2, in the stacking relation the end leg portion 22 of the top basket will overlap the sides of the lower basket and the portion of the U-shaped members 14 which extend above rim 10 of the lower basket will project inside the base wires 18 of the upper basket. Thus, horizontal movements of the upper basket is prevented in both lateral and longitudinal directions. In this manner, several baskets may be stacked saving floor space in the cooler or other storage area. Stacking does not interfere with air circulation and efficient cooling is achieved with any number of stacked baskets.

If desired, the handle 42 may be constructed for easy removal to facilitate removal of the loaded flats. This is accomplished by "springing" the sides of the basket together far enough to unhook the loops from the wire portions 16. The handle 42 is usually removed during the unloading of the basket only as the basket is usually carried about during the loading procedure.

It will thus be observed that the basket of the invention may be carried by the collector of the eggs, the eggs being removed directly from the nests or batteries to the flats, the flats are accessibly carried on the extended rack 46 and the danger of breakage and damage to the eggs is greatly reduced over prior egg collection methods. The baskets also serve as cooling racks and their lightweight and simplicity encourage a dual function as a collection basket and a cooling rack.

We claim:

1. In a wire egg crate for use with filler flats, a frame including a series of planar U-shaped side members having vertical leg portions and a horizontal leg interconnecting portion, the planes of said side members being in spaced, parallel, side-by-side relation, a substantially rectangular rim wire member affixed to the upper ends of the leg portion of said side members, a base wire member having opposed side portions attached to the leg interconnecting portion of said side members adjacent said leg portions and having leg portions extending therebelow, wire members disposed between said rim wire and said base wire enclosing one end of said frame, retaining members partially enclosing the other end of said frame providing access to the interior of said frame the entire depth thereof, a shelf within said frame affixed to said side members in spaced parallel relation to said side member horizontal leg interconnecting portions for support of said filler flats, a retractable rack supported by said frame adapted to be extended laterally therefrom to provide a supporting surface for unused filler flats, said rack slidingly engaging the horizontal leg interconnecting portions of at least two of said U-shaped side members, and being totally supported by said crate, and a handle attached to said frame centrally related above said rim wire.

2. In a wire egg crate for receiving filler flats and other egg containers, a frame including a plurality of U-shaped side members consisting of vertical leg portions interconnected by a horizontal portion, the planes of said side members being in spaced, parallel, side-by-side relation, a base member formed of a planar rectangular wire frame having side and end portions, said base member side portions being deformed in a common direction perpendicular to the plane of the base member near said end portions whereby the deformed side portions constitute base member leg portions connected by said end portions, the undeformed base member side portions being affixed to said side members adjacent the junction of the side member leg and horizontal portions whereby said base member leg portions extend away from the side member leg portions, a rim member affixed to the upper regions of the leg portions of said side members having a substantially horizontal rectangular configuration, one side of said rim being centrally interrupted, retaining portions depending from said interrupted rim side extending toward said base member and affixed to one of the leg connecting end portions thereof, portions of said side members extending above said rim member, wire members interposed between the rim side opposite said interrupted side and the other of the base member leg connecting end portions, the distance between said leg connecting end portions of said base member being slightly greater than one of the lateral dimensions of said rim member, and the dimension between the base elements being slightly greater than the distance between said portions of said side members extending above said rim member, whereby said egg crate may be interlocked in vertical stacked relation upon resting the horizontal portions of the side members of one of said crates upon the rim member of a similar crate.

References Cited in the file of this patent

UNITED STATES PATENTS

| | | |
|---|---|---|
| 1,208,020 | Ross | Dec. 12, 1916 |
| 2,179,981 | Mooter et al. | Nov. 14, 1939 |
| 2,554,232 | Young | May 22, 1951 |
| 2,739,715 | Planeta | Mar. 27, 1956 |
| 2,790,556 | Burt | Apr. 30, 1957 |

FOREIGN PATENTS

| | | |
|---|---|---|
| 87,297 | Norway | Apr. 23, 1956 |
| 1,072,572 | France | Mar. 17, 1954 |